United States Patent [19]

Gebke et al.

[11] 4,436,676

[45] Mar. 13, 1984

[54] COOLING PLANT

[75] Inventors: Klaus Gebke, Gelnhausen; Friedrich Hühn, Offenbach; Rolf Lekutat, Neu-Isenburg, all of Fed. Rep. of Germany

[73] Assignee: Kraftwerk Union Aktiengesellschaft, Mülheim, Fed. Rep. of Germany

[21] Appl. No.: 353,882

[22] Filed: Mar. 2, 1982

[30] Foreign Application Priority Data

Mar. 9, 1981 [DE] Fed. Rep. of Germany ....... 3108855

[51] Int. Cl.³ .............................................. B01F 3/04
[52] U.S. Cl. .................. 261/151; 261/23 R; 261/110; 261/29
[58] Field of Search ................ 261/23 R, 29, 151, 110

[56] References Cited

U.S. PATENT DOCUMENTS

| 2,480,286 | 8/1949 | Collis . | |
|---|---|---|---|
| 2,732,190 | 1/1956 | Mart | 261/110 |
| 4,299,786 | 11/1981 | Sanderson et al. | 261/23 R |

FOREIGN PATENT DOCUMENTS

| 82748 | 2/1921 | Austria | 261/110 |
|---|---|---|---|
| 2227208 | 12/1972 | Fed. Rep. of Germany | 261/23 R |
| 53-85544 | 7/1978 | Japan . | |

*Primary Examiner*—Tim R. Miles
*Attorney, Agent, or Firm*—Herbert L. Lerner; Laurence A. Greenberg

[57] ABSTRACT

Plant for cooling water circulating in a secondary cooling loop, including a plurality of parallel operating cooling cells each having a blower, a drive motor for the blower and a cooling water pump having a suction side, the cooling water pumps of the cooling cells being separately drivable, a cold water basin connected to the cooling cells, a secondary cooling water pump connected to the cold water basin, a heat exchanger connected to the secondary cooling water pump, a warm water basin being directly connected to the suction side of the cooling water pumps and being disposed upstream of the cold water basin, and means disposed between the warm water basin and the cold water basin for providing an overflow therebetween.

2 Claims, 5 Drawing Figures

COOLING PLANT

BACKGROUND OF THE INVENTION

1. Field of the Invention:

The invention relates to the field of cooling technology and can be applied to the circuit construction of cooling plants which includes a plurality of cooling cells operating in parallel.

2. Description of the Prior Art:

In large-scale technical plants, cooling plants are used for the removal of excess process heat, these include a primary and a secondary coolant loop, both cooling loops being coupled through a heat exchanger. In the secondary cooling loop, cooling towers are used for transferring the heat to the environment. The cooling water therein trickles or drips down and is brought into contact with the atmospheric air. In this connection, a distinction must be drawn between naturally ventilated and artificially ventilated cooling towers. The artificially ventilated cooling towers are equipped with at least one blower which draws or pushes the air through the cooling tower (see, for example, the DIN Publication of 1947, Issued June 1959, entitled "Performance Tests on Cooling Towers"; and the journal "Waerme", Volume 79, No. 1, Pages 5 to 9).

Artificially ventilated cooling towers (blower cooling towers) of small construction are frequently provided in larger numbers and operate in parallel in order to obtain a high cooling capacity. These cooling towers, also called "Cooling Cells", always include, in addition to a motor-driven blower, a cooling water pump which precedes the spraying device for the warm water entering the cooling cell. The cold water leaving the cooling cell is fed to a common cold water collecting basin from which it is fed to the heat exchanger by means of a pump (secondary cooling water pump). The warmed cooling water can first be collected in a warm water basin and travels from there to the cooling cells by means of appropriate pumps (see the brochure "Wet Cooling Towers" of the firm Balcke-Dürr, No. 2000-3/76). To adapt the cooling plants, constructed from several cooling cells provided for operation in parallel, to different cooling loops, as well as to operating and/or weather conditions, electrically controlled hydraulic circuits are required which are essentially characterized by the use of controlled valves and expensive control circuits. This engenders a certain degree of being trouble prone to the entire cooling plant.

SUMMARY OF THE INVENTION

Technical Problem:

Starting out from a device for recooling the cooling water which circulates in a secondary cooling loop, which includes a plurality of cooling cells that are provided for operation in parallel and each have a blower with drive motor and a cooling water pump leading to the cold water basin, a heat exchanger and a secondary cooling water pump associated with the heat exchanger as well as a warm water basin, to which the intake sides of the cooling water pumps are connected, it is accordingly an object of the invention to provide a cooling plant which overcomes the hereinafore-mentioned disadvantages of the heretofore-known devices of this general type to simplify the amount of circuit means necessary for adapting the cooling plant to different cooling loops and different operating and/or weather conditions, and also to simultaneously satisfy increased safety requirements which apply, for instance, to nuclear power stations.

Solution:

With the foregoing and other objects in view there is provided, in accordance with the invention, a plant for cooling water circulating in a secondary cooling loop, comprising a plurality of parallel operating cooling cells each having a blower, a drive motor for the blower and a cooling water pump having a suction side, the cooling water pumps of the cooling cells being separately drivable, a cold water basin connected to the cooling cells, a secondary cooling water pump connected to the cold water basin and assigned to a heat exchanger connected to the secondary cooling water pump, a warm water basin being directly connected to the suction side of the cooling water pumps and being disposed upstream of the cold water basin, and means disposed between the warm water basin and the cold water basin for providing an overflow therebetween.

Advantages and Further Embodiments:

An achievement of this embodiment of the cooling plant is that the cooling cells for operation in parallel can be operated independently of each other, so that the coolant loop is maintained even if none of the cooling cells are in operation. The coolant loop can be closed in this case by a bypass which is formed by the overflow between the warm water basin and the cold water basin. If necessary, this bypass assumes its function without any additional electrical and/or hydraulically controlled elements. This is the case, for instance, if cooling the cooling water is not necessary and all cooling cells are shut down, or if, for a small amount of cooling, only the operation of one or a few cooling cells is necessary and the entire amount of cooling water produced is not taken up by the cooling cells in operation (backup in the warm water basin, overflow in the cold water basin, rise of the cold water temperature in the cold water line), and furthermore, if more cooling cells are in operation than is necessary for the hydraulic equilibrium (backup in the cold water basin, overflow into the warm water basin, low cold water temperature) or if one or more cooling cells fail, due to a disturbance. By means of the drive of the individual cooling cells being independent of each other, a very simple adaptation of the entire device to different cooling loops as well as to operating and/or weather conditions, is incidentally provided. This is of particular importance for winter operation because excessive cooling of the cooling water can easily lead to icing in this case. The desired adaption of the cooling plant accordingly takes place by connecting and disconnecting individual cooling cells, this being accomplished in the customary manner as a function of the cooling water temperature. This manner of adaptation by the way includes the possibility of assigning more than one primary cooling loop to the cooling cells.

In this connection it is advantageous to couple the drive motor or the blower of a cooling cell to the respective cooling water pump through an appropriate transmission; in this case, the respective cooling cell is either in or out of operation as a whole. However, a common control of the blower motor and the pump motor can also be provided.

If it is desired to take special safety concerns into consideration, in accordance with another feature of the invention, each cooling cell includes a transmission connecting the drive motor to the cooling water pump;

in accordance with a further feature of the invention, there is provided a structure separate from the cooling cells and basins, the drive motor and transmission being disposed in the separate structure, and a mechanical shaft connected between the drive motor and the blower; and in accordance with an added feature of the invention, each cooling cell includes a warm water feed line or hot water pipe connected between the warm water basin and the suction side of the cooling water pump, the cooling water pump and the feed line being disposed in the separate structure or in another one.

In this manner, the electrical and hydraulic facilities of the cooling cell can be effectively protected against external influences.

In the mutual relationship of the warm water and cold water basin, the further development of the invention can take different approaches. For instance, in accordance with an additional feature of the invention, the warm water basin includes a preliminary basin and a main basin connected downstream of the preliminary basin, the main basin being disposed at a lower level than the preliminary basin and being substantially closed on all sides thereof, and the overflow means being part of the preliminary basin providing overflow between the preliminary basin and the cold water basin.

In accordance with again another feature of the invention, the main basin is disposed below the cold water basin.

A particularly advantageous variant of the mutual relationship of the warm water and cold water basin is provided if in accordance with again a further feature of the invention, the warm water basin includes a main basin being substantially closed on all sides thereof and a secondary basin being disposed at a higher level than the main basin and being connected downstream thereof, the overflow means being part of the secondary basin providing overflow between the secondary basin and the cold water basin.

In this case, the volume of the warm water basin can be minimized if, in accordance with again an added feature of the invention, the main basin is in the form of a canal-like trough to the intake nozzles of the cooling water pumps. The consequence of this feature is that the quantity of the cooling water which can be stored in the warm water basin and in the cold water basin is essentially given by the volume of the cold water basin, so that in an emergency, approximately the entire amount of cooling water present in the secondary coolant loop is available for evaporation in the wet cooling cells. In another extreme operating condition, in which no cooling of the cooling water is necessary, a short circuit of the coolant loop through the bypass "canal-like warm water basin/following or secondary basin with the overflow/cold water basin" is provided. This last-mentioned variant can be provided very advantageously if, in accordance with again an additional feature of the invention, the secondary basin is in the form of a shallow cup forming a cold water collecting or catching basin upstream of the cold water basin.

The physical relationship of the different basins can then be achieved if, in accordance with a concomitant feature of the invention, the relatively large cold water basin is disposed at a lower level than the relatively small main and shallow secondary collecting warm water basins, or only below the secondary basin.

BRIEF DESCRIPTION OF THE DRAWING

Other features which are considered as characteristic for the invention are set forth in the appended claims.

Although the invention is illustrated and described herein as embodied in a cooling plant, it is nevertheless not intended to be limited to the details shown, since various modifications and structural changes may be made therein without departing from the spirit of the invention and within the scope and range of equivalents of the claims.

Figure 1:
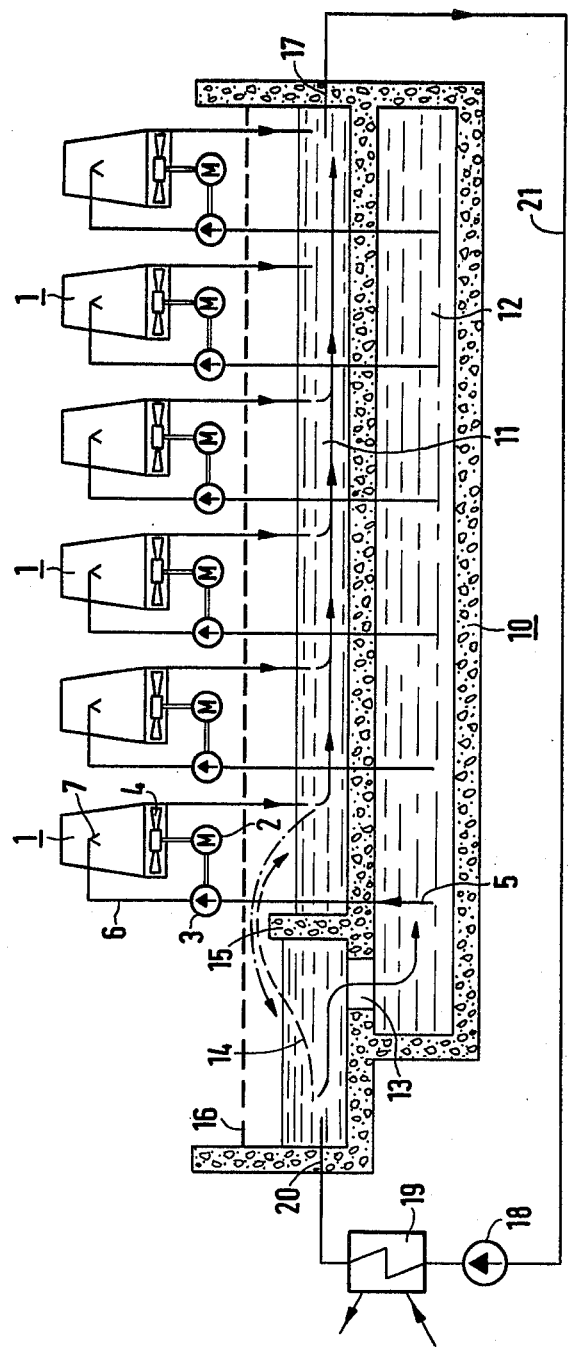
Figure 2:
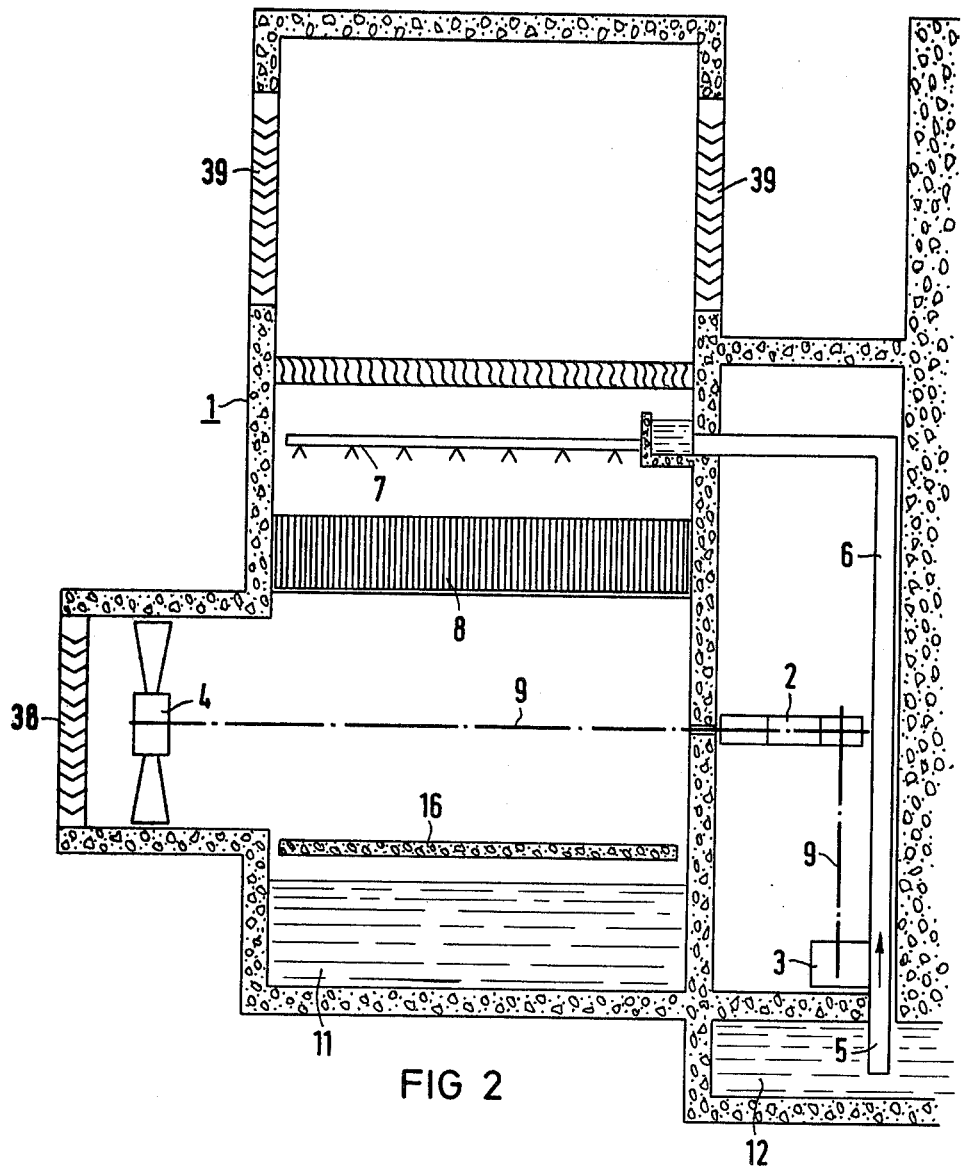
Figure 3:
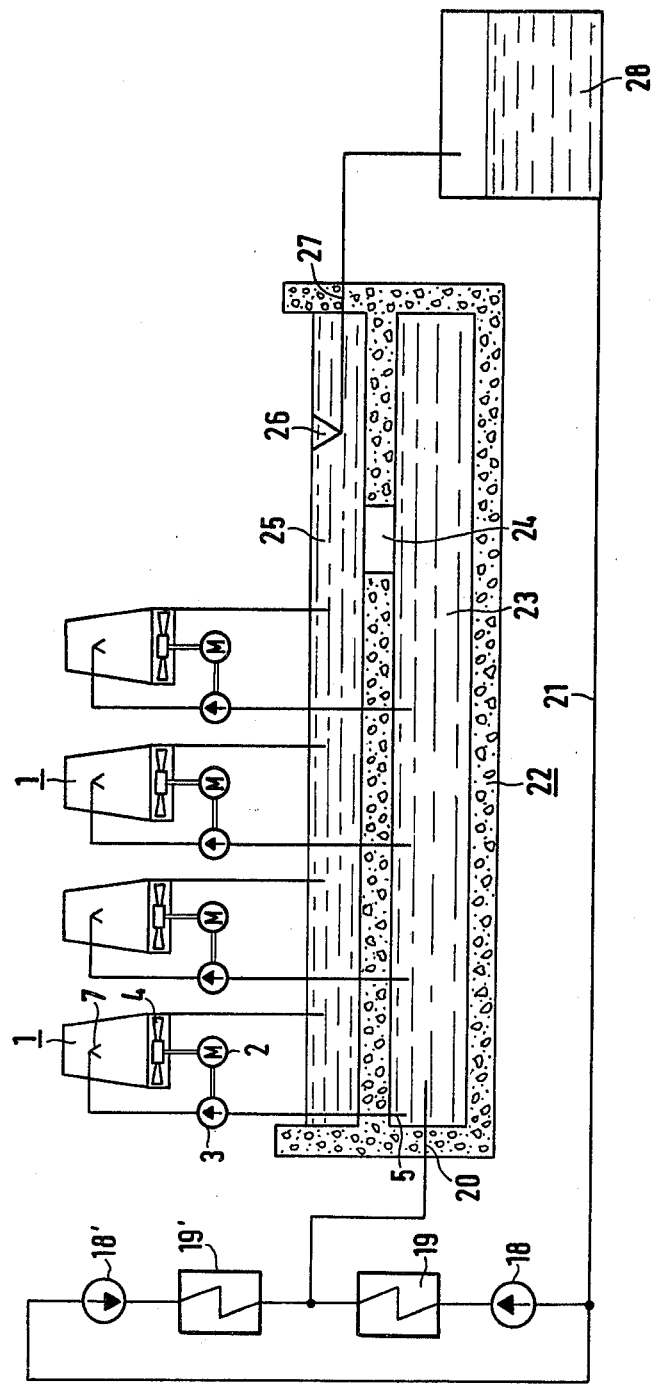
Figure 4:
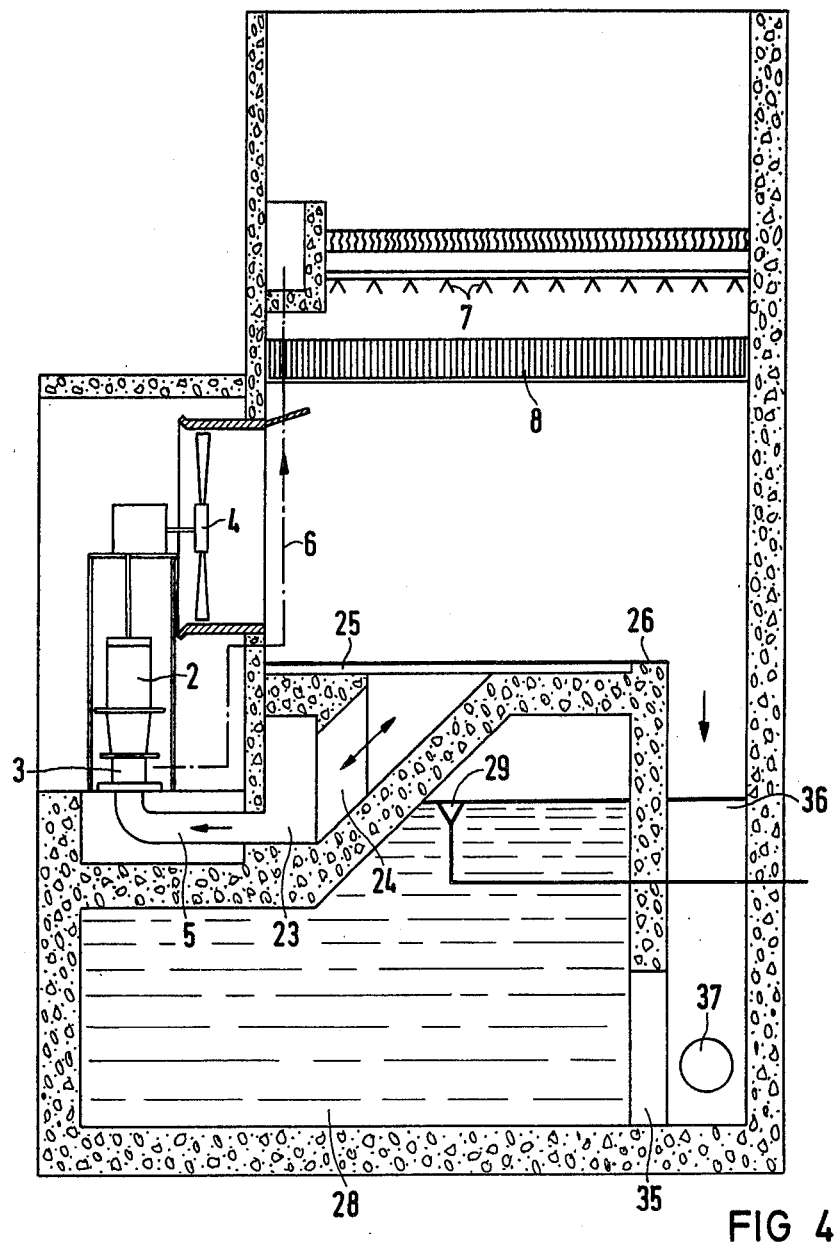
Figure 5:
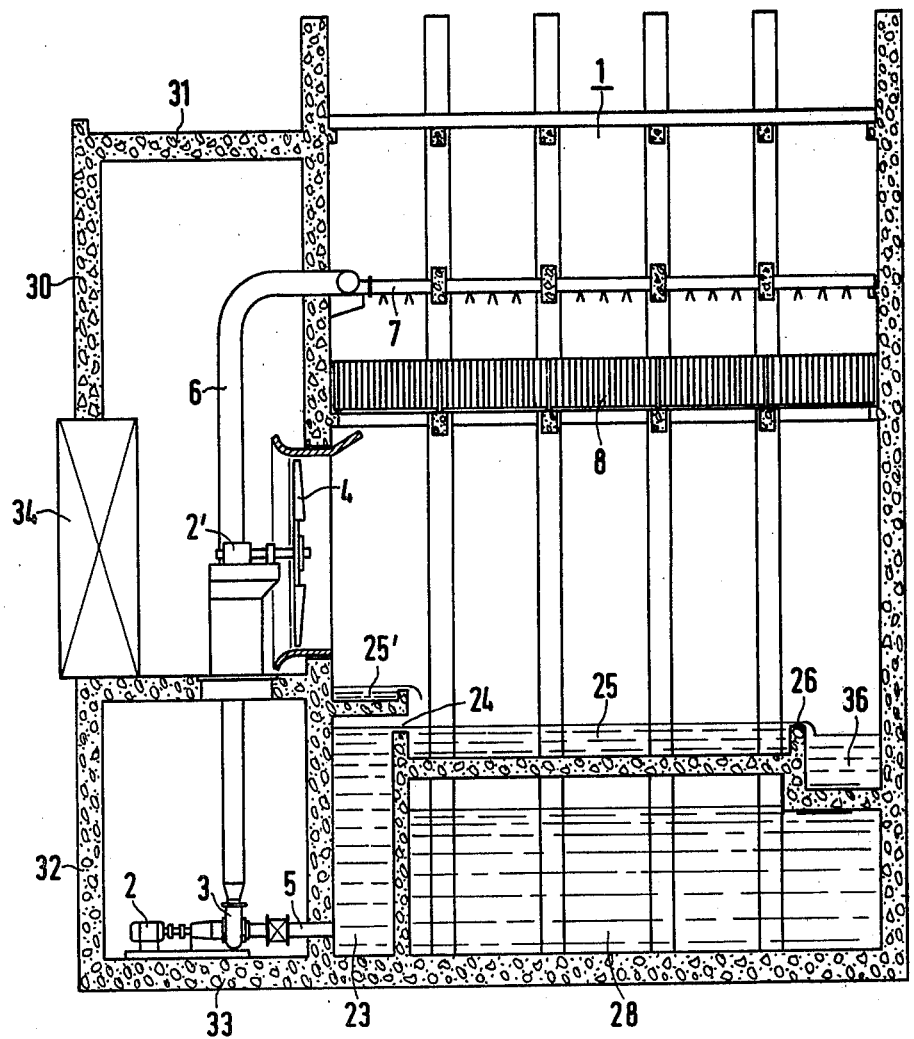

The construction and method of operation of the invention, however, together with additional objects and advantages thereof will be best understood from the following description of specific embodiments when read in connection with the accompanying drawings, in which:

FIGS. 1 and 2 are schematic and diagrammatic views of embodiment examples of the invention in which the warm water basin is formed of a preliminary basin provided with an overflow and a following or after-connected main basin; and FIGS. 3, 4 and 5 are views similar to FIGS. 1 and 2 of embodiment examples according to the invention, in which the warm water basin is only formed of a main basin and a following basin provided with the overflow, which at the same time precedes the cold water basin as the catching basin for the cold water.

DESCRIPTION OF THE PREFERRED EMBODIMENTS

Referring now to the figures of the drawing and first particularly to FIG. 1 thereof, there is seen a cooling plant for cooling water which circulates in a secondary cooling loop, is pumped by means of a preceding secondary cooling water pump 18 into a basin facility 10, and is cooled by means of cooling cells 1 which are disposed in such a way as to operate in parallel. Each diagrammatically illustrated cooling cell 1 contains a drive motor 2 which is coupled to a cooling water pump 3 as well as to a blower 4. In this embodiment the cooling water is drawn in through a suction nozzle 5 and is fed to a water distribution system 7 through a feed line 6.

The basin facility 10 into which the warmed cooling water enters through a feed 20 and from which the water leaves through an outlet 17, substantially includes a warm water basin 12, a cold water basin 11 and a preliminary basin 14 which precedes or is upstream of the warm water basin 12. A covering 16 is provided for the entire basin device.

In the operation of the cooling plant, the warmed cooling water is first transported in the preliminary basin 14 and from there it travels through an opening 13 in the bottom of the preliminary basin 14 into the warm water basin 12. From the basin 12, the water is drawn off through the suction nozzles 5 of the individual cooling cells 1 and is cooled in the cooling cells 1. The cooled cooling water is collected in the cold water basin 11.

Between the preliminary basin 14 and the cold water basin 11, there is disposed a wall 15, which has a height that is less than the lateral boundary walls of the basin facility and which can therefore be washed from the preliminary basin 14 or from the cold water basin 11. This partition 15 operates as a bypass, by way of which equalization processes between the cold water basin 11 and the warm water basin 12 can take place. If, for instance, the pumps 3 of the individual cooling cells are not in operation, the warmed cooling water becomes backed up in the warm water basin 12 until it flows over the overflow edge of the partition 15 into the cold water basin 11. The uncooled warmed cooling water is drawn off from the cold water basin through the secondary cooling water pump 18 and is pumped into the secondary cooling loop.

If, on the other hand, the cooling water pumps 3 of the individual cooling cells are in operation, they transport the warmed cooling water from the warm water basin 12, through the intake nozzles 5, into the cooling cells 1 and from there into the cold water basin 11. The water which is cooled in this way is drawn off by the secondary water pump 18 and is pumped through a feed line 21 into the secondary cooling loop, and therefore into a heat exchanger 19.

If more cooling cells 1 are in operation than is necessary for the hydraulic equilibrium of the cooling plant, the cold water becomes backed up in the cold water basin 11 until it flows over the overflow edge of the partition 15 into the preliminary basin 14 and from there into the warm water basin 12.

If, on the other hand, fewer cooling cells are in operation than is necessary for the hydraulic equilibrium, the warmed cooling water is backed up in the warm water basin 12 until it flows over the overflow edge of the partition 15 into the cold water basin.

The hereinafore-mentioned equalizing processes take place without actuating any hydraulic control elements whatsoever.

FIG. 2 shows a construction of the embodiment example of the cooling plant which is diagrammatically and schematically shown in FIG. 1. The cooling cells and the basin facility are structurally combined with each other in this case.

The cooling cell 1 with the water distribution system or spraying device 7 and cooling components 8 proper, is disposed above the cold water basin 11 which is covered by plates 16 except for outer zones thereof. Between the cold water basin 11 and the cooling components 8, the blower 4 is disposed laterally. Proper feeding of the intake opening of the blower 4 is insured by a baffle plate or louvers 38. The cooling cell is closed toward the top thereof in roof fashion, operation of lateral air outlet openings being insured by baffle plates 39.

Outside of the housing of the cooling cell proper, there is disposed a motor 2. On one side thereof the motor 2 drives the blower 4 through a transmission that is not specifically illustrated and a shaft 9. On the other side thereof, the motor 2 drives the cooling water pump 3 through a transmission that is also not specifically designated and through another shaft 9'. The cooling pump 3 is associated with the pipeline 6, the suction nozzle 5 thereof extending into the warm water basin 12. In this case, the motor with the two transmissions as well as the cooling water pump and the warm water feed line are disposed outside the cooling cell proper in a separate room or structure.

In the embodiment example schematically and diagrammatically shown in FIG. 3, several cooling cells 1 that are disposed in such a way as to operate in parallel, are likewise located above a basin facility 22. Each cooling cell 1 includes the drive motor 2, the cooling water pump 3, the blower 4 and the water spraying device 7, and each are supplied with cooling water by the intake nozzle 5. Otherwise, two secondary cooling loops are provided in this embodiment example. A first cooling loop is provided by a water outlet 27, a storage tank 28 which at the same time represents the cold water basin, the feed line 21, the secondary cooling water pump 18, the heat exchanger 19 and the water inlet 20. An independent second cooling loop is formed by a second heat exchanger 19' and a second secondary cooling water pump 18'. Furthermore, this second cooling loop, which is hydraulically and thermally constructed differently from the first cooling loop, is controlled by the cooling cells 1 or cooling cell battery constructed in such a way as to operate in parallel without switching valves. The basin facility 22 includes a warm water basin 23 having an opening 24 leading upward into a following or after-connected basin 25. The following basin 25 is substantially in the form of a shallow cup which simultaneously serves as a collecting basin for the cooled cooling water coming from the cooling cells 1. This shallow cup 25 is provided with an overflow 26 which feeds the cooled cooling water to the cold water basin 28.

If, in the embodiment example shown in FIG. 3, the cooling water pumps 3 of the individual cooling cells are not in operation, the warmed cooling water is pumped by means of the secondary cooling water pump 18 from the cold water basin 28, through the heat exchanger 19, and into the warm water basin 23 which is constructed as a water feed canal. From the warm water basin 23, the cooling water flows through the opening 24 which represents an equalizing line, into the following basin 25 constructed as a shallow cup. This following basin is filled until the cooling water flows through the overflow 26 back into the cold water basin 28. The bypass operation through the equalizing line or opening 24 can be maintained until the cooling water temperature in the outgoing flow is so high that the individual cooling water pumps and the blowers 4 are switched on one after the other. It is not necessary for this purpose to control any valves.

In normal operation, the warmed cooling water is fed by means of the cooling water pumps 3 to the water distribution divices 7 in the cooling cells. From the distribution devices 7, the cooling water travels into the shallow cup 25 through the cooling components. This cup is filled until the cooling water flows back into the cold water basin or the storage device 28 through the runoff edge of the overflow 26. From the storage tank 28, the cooling water is suctioned up again and the process is repeated.

If more cooling pumps 3 are in operation than is necessary for the hydraulic equilibrium, part of the cooling water is conducted through the equalizing line 24 into the warm water canal 23 and from there back to the individual cooling cells. In this way, a steadily decreasing water temperature is obtained in the shallow cup 25.

If, on the other hand, fewer cooling water pumps 3 are in operation than is necessary for the hydraulic equilibrium, then part of the warmed cooling water is pumped through the equalizing line 24 directly into the shallow cup 25 and the water flows back into the cold water basin 28 past the runoff edge of the overflow 26. This causes the temperature of the cold water to rise. By switching the individual cooling cells on and off, control of the cold water temperature can therefore be achieved.

An actual construction for the embodiment example shown diagrammatically and schematically in FIG. 3 is shown in FIG. 4. Accordingly, disposed in a housing of a cooling cell which is not specifically designated in the drawing, and underneath the water distribution device 7 and the cooling components 8 proper, are the cold water collecting basin 25, the warm water basin 23 with the equalizing line 24 and the cold water basin 28. Laterally disposed above the collecting basin 25 is the blower 4 which is driven by the motor 2. The motor 2 simultaneously drives the cooling water pump 3 which suctions up the warm cooling water from the warm water basin 23 through the suction line 5 and pumps it through the diagrammatically illustrated warm water feedline 6 to the water distribution device 7.

In the present embodiment example, the warm water basin 23 is merely constructed as a canal-like water feed which is connected through an equalizing opening 24 to the collecting basin 25 which is in the form of a shallow cup. The overflow 26 is formed by a wall of the cold water basin 28 which is drawn upward. The cold water basin 28 is in communication with a feed canal 36 through an opening 35. The cooling water is suctioned off from the cold water basin 28 through an opening 37. The overflow 29 comes into operation when the cold water basin 28 is filled.

A further variant of the schematic and diagrammatic embodiment example according to FIG. 3 is shown in FIG. 5. In the FIG. 5 embodiment the cooling plant proper is disposed separately from the various drive units. The motor 2 for driving the cooling water pump 3 and a motor 2' for driving the blower 4 as well as the feedline 6 leading to the water distribution device 7, are located in a structure which is bounded by the bottom plate 33 and the side and ceiling walls 30, 31 and 32, the blower being secured against the outside by a baffle plate 34. Disposed in the cooling cell 1 proper below the water distribution device 7 are the cooling components 8 proper, and in the lower region of the cell 1 are the various water basins. The cold water basin 28 which is laterally associated with the canal 23 for feeding in the warmed cooling water, should be mentioned first. Suction lines 5 lead from the canal 23 to the individual cooling water pumps 3.

The warm water canal 23 is provided at the top thereof with an equalizing opening 24 which connects the warm water canal to the shallow cup 25. On the other side of the shallow cup 25 is the overflow edge 26, from which the cooling water is transported through the flowoff canal 26 into the cooling water storage device 28.

The overflow edge of the equalizing opening 24 is constructed so as to be somewhat lower than the overflow edge 26, so that the cooling water flows from the shallow cup 25 into the canal 36 and therefore into the storage device 28 only if the warm water canal 23 and the shallow cup 25 are filled. This control of the overflow can also be achieved by providing different lengths of the overflow edges at the same height. Otherwise, provided above the warm water canal 23 is an additional shallow cup 25' which merely covers the warm water canal 23 and forms the upper termination thereof.

There are claimed:

1. Plant for cooling water circulating in a secondary cooling loop, comprising a plurality of parallel operating cooling cells each having a blower, a drive motor for said blower and a cooling water pump having a suction side, said cooling water pumps of said cooling cells being separately drivable, a cold water basin connected to said cooling cells, a secondary cooling water pump connected to said cold water basin, a heat exchanger connected to said secondary cooling water pump, a warm water basin being connected to said heat exchanger, being directly connected to said suction side of said cooling water pumps and being disposed upstream of said cold water basin, and means disposed between said warm water basin and said cold water basin for providing an overflow therebetween, said warm water basin including a main basin in the form of a canal-like trough being substantially closed on all sides thereof and a secondary basin being disposed at a higher level than said main basin and being connected downstream thereof, said secondary basin being in the form of a shallow cup forming a cold water collecting basin upstream of said cold water basin, and said overflow means being part of said secondary basin providing overflow between said secondary basin and said cold water basin.

2. Cooling plant according to claim 1, wherein said cold water basin is disposed at a lower level than said main and secondary water basins.

* * * * *